(12) United States Patent
Pal et al.

(10) Patent No.: US 6,219,675 B1
(45) Date of Patent: Apr. 17, 2001

(54) DISTRIBUTION OF A CENTRALIZED DATABASE

(75) Inventors: Shankar Pal, Redmond; John G. Bennett, Bellevue, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/869,588

(22) Filed: Jun. 5, 1997

(51) Int. Cl.[7] .................................................. G06F 17/30
(52) U.S. Cl. ................................. 707/201; 707/1; 707/3; 707/8; 707/100; 707/200; 707/202; 709/104; 709/201; 709/203
(58) Field of Search .............................. 707/8, 200, 201, 707/3, 202, 1, 100

(56) References Cited

U.S. PATENT DOCUMENTS

| | | | |
|---|---|---|---|
| 5,187,790 | * | 2/1993 | East et al. ............................. 709/304 |
| 5,202,971 | * | 4/1993 | Henson et al. .......................... 707/8 |
| 5,241,675 | * | 8/1993 | Sheth et al. ............................ 707/8 |
| 5,408,470 | * | 4/1995 | Rothrock et al. ..................... 370/261 |
| 5,430,876 | * | 7/1995 | Schreiber et al. .................... 709/304 |
| 5,504,899 | * | 4/1996 | Raz ....................................... 707/10 |
| 5,734,898 | * | 3/1998 | He ........................................ 707/203 |
| 5,758,355 | * | 5/1998 | Buchanan ............................. 707/201 |
| 5,832,508 | * | 11/1998 | Sherman et al. ..................... 707/200 |
| 5,862,323 | * | 1/1999 | Blakley, III et al. ................. 713/200 |
| 5,884,323 | * | 3/1999 | Hawkins et al. ..................... 707/201 |
| 5,896,495 | * | 4/1999 | Stein et al. ............................ 718/38 |

OTHER PUBLICATIONS

Date, C. J., *An Introduction to Database Systems*, vol. II, Addison–Wesley/1983, pp. 1–142.*

Jing, Jin. et al., "Distributed Lock Management for Mobile Transactions," Proceedings of the 15th International Conference on Distributed Computing Systems, Vancouver, BC, Canada, May 30–Jun. 2, 1995, pp. 118–125.*

* cited by examiner

*Primary Examiner*—John Breene
*Assistant Examiner*—Cheryl R. Lewis
(74) *Attorney, Agent, or Firm*—Schwegman, Lundberg, Woessner & Kluth, P.A.

(57) ABSTRACT

A system that improves performance of a centralized DBMS is provided. The improved performance is realized by distributing part of the DBMS's functionality across multiple computers in a client/server environment. The distribution of the DBMS's functionality is performed by a mechanism known as the navigational agent, which is detached from the DBMS. The navigational agent integrates the centralized DBMS into a client/server environment so that performance improvements can be achieved by distributing a portion of the functionality of the centralized DBMS and some of its database objects to client computers. A database object is a unit of data in the database such as one or more fields of a record, one or more records, or one or more tables. By distributing part of the DBMS's functionality and some of the database objects to client computers, transactions can be performed on the client computers without having to access the server computer on which the database resides. Since these transactions are performed by the client computer instead of the server computer, the bottleneck created by the DBMS on the server computer is reduced, which improves performance of both the DBMS and programs interacting with the DBMS.

45 Claims, 7 Drawing Sheets

| Transaction A | Time | Transaction B |
|---|---|---|
| SELECT X<br>COPY X INTO TEMP 1 | T1 | |
| | T2 | SELECT X<br>COPY X INTO TEMP 2 |
| UPDATE X WITH<br>TEMP 1 + 1 | T3 | |
| | T4 | UPDATE X WITH<br>TEMP 2 * 2 |
| SELECT Y | T5 | SELECT Z |
| UPDATE Y<br>WITH Y + 1 | T6 | UPDATE Z<br>WITH Z + 1 |

*Fig. 1A (Prior Art)*

| Transaction A | Time | Transaction B |
| --- | --- | --- |
| SELECT X<br>COPY X INTO TEMP 1 | T1 | |
| UPDATE X WITH<br>TEMP 1 + 1 | T2 | |
| SELECT Y | T3 | SELECT X<br>COPY X INTO TEMP 2 |
| UPDATE Y<br>WITH Y + 1 | T4 | UPDATE X WITH<br>TEMP 2 * 2 |
| | T5 | SELECT Z |
| | T6 | UPDATE Z<br>WITH Z + 1 |

DISTRIBUTION OF A CENTRALIZED DATABASE

TECHNICAL FIELD

The present invention relates to data processing systems and, more particularly, to the distribution of a centralized database.

BACKGROUND OF THE INVENTION

A Database Management System (DBMS) provides users and application programs with the ability to retrieve data from a database, such as a relational database. A relational database is a collection of tables of data. Each table contains records of a certain type, and each type of record contains fields in which the data is stored. In retrieving data from the database, a well-known query language like the Structured Query Language (SQL) can be used. SQL is both an interactive query language that can be used by a user and a database programming language that can be used by application programs. Many database management systems have been developed that utilize SQL.

SQL defines four basic statements for programmatically performing operations on a database: select, update, delete, and insert. The select statement retrieves specific records or fields of records that match a particular selection criteria. For example, in a table of employee information having records with fields for first names and addresses, the select statement can be utilized to retrieve the addresses for all employees with the first name "Joe." The selection criteria of the select statement is referred to as the predicate of the statement. The update statement is used to update or modify records or fields of records that satisfy particular selection criteria. The delete statement deletes records that satisfy particular selection criteria, and the insert statement inserts a record into an identified table.

When issuing statements to a database, transactions containing a series of statements are typically used. A "transaction" contains a series of statements that together perform one logical unit of work and that satisfies the properties of atomicity, consistency, isolation, and durability as described in Date, *An Introduction to Database Systems,* Vol. II, Addison-Wesley (1983), at pp. 1–142. For example, a logical unit of work may retrieve employment information for all employees whose first name is Joe and increase their salaries by ten percent. The first statement contained in a transaction is typically the "Begin Transaction" statement, which indicates to the DBMS that a transaction is about to begin. The DBMS uses this indication to identify any updates requested during the transaction as being tentative only, not permanent, so that if an error occurs, the updates can be undone easily. The updates are considered to be tentative until such time as the caller issues a "Commit" statement. Upon receiving a "Commit" statement, the DBMS performs all updates in the transaction. However, if an error occurred during the processing of the transaction, the caller can issue a "Rollback" statement which cancels the transaction and returns the database to its pre-transaction state. Therefore, a transaction either executes in its entirety or is completely canceled. In either case, the transaction is said to have completed. In this manner, a transaction makes a sequence of operations that is non-atomic operate as though it were atomic.

Figure 1A:
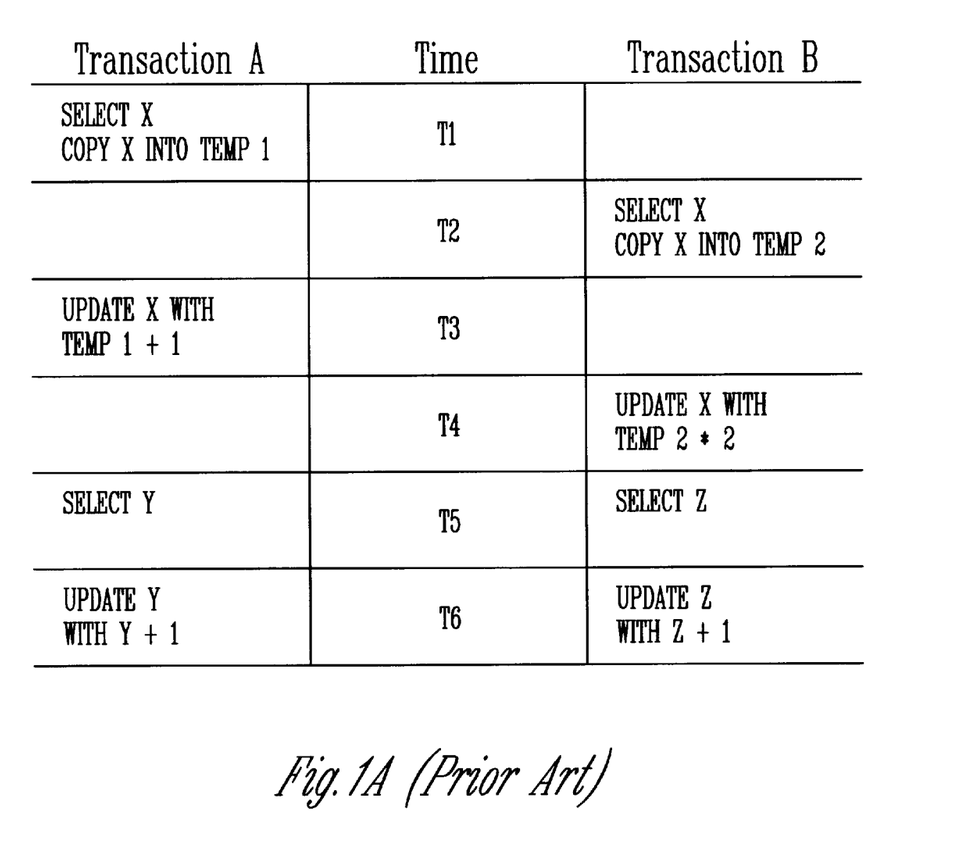
FIG. 1A depicts two transactions occurring simultaneously in which a concurrency problem occurs.

When more than one transaction is being processed by a DBMS, concurrency problems can arise which lead to the unreliable execution of the transactions. An example of such a concurrency problem is depicted in FIG. 1A. FIG. 1A depicts two transactions, transaction A and transaction B, which are being executed on a database simultaneously. Transaction A increments a field X and a field Y, and transaction B multiplies the value of field X by 2 and increments field Z. The processing of the transactions is depicted chronologically with respect to times T1–T6. At time T1, transaction A retrieves a field X of a record using a select statement and stores the value of the field into a variable "temp1." At time T2, transaction B retrieves the value of field X and copies this value into a variable "temp2." At time T3, transaction A updates field X with the original value of X incremented by 1. At time T4, transaction B updates field X with the original value of X multiplied by 2, which nullifies transaction A's processing with respect to this field. At time T5, transaction A retrieves field Y and transaction B retrieves field Z. At time T6, transaction A updates Y with Y+1 and transaction B updates Z with Z+1. The processing performed at times T5 and T6 do not pose any concurrency problems because the actions are performed on unrelated fields.

One technique used to solve concurrency problems is to serially execute the transactions so that only one transaction ever executes on the DBMS at a time. For example, transaction A executes completely and then transaction B executes. In this manner, concurrency problems are avoided. However, if the DBMS can only process a single transaction at a time, the DBMS becomes a bottleneck and transactions may have to wait a significant amount of time before being processed. Serial execution is an undesirable solution to concurrency problems because many transactions are sufficiently unrelated (i.e., the transactions do not operate on common data) such that they can execute concurrently and pose no concurrency problems. Having a transaction that is unrelated to an executing transaction wait before being executed is an unnecessary restriction and slows down both the performance of the DBMS and the performance of the programs that issue the transactions.

In order to simultaneously process database transactions and prevent concurrency problems from occurring, some conventional DBMSs execute transactions in a serializable manner. A serializable execution of transactions guarantees that a correct result occurs. A "correct" result is a result that would occur had the transactions been executed serially in some order. In the example of FIG. 1A, a correct result for field X is either $(X*2)+1$ or $(X+1)*2$. From the perspective of the database, either one of these results is a correct result. Serializable execution of transactions is an interleaved execution of the transactions that produces a correct result.

Figure 1B:
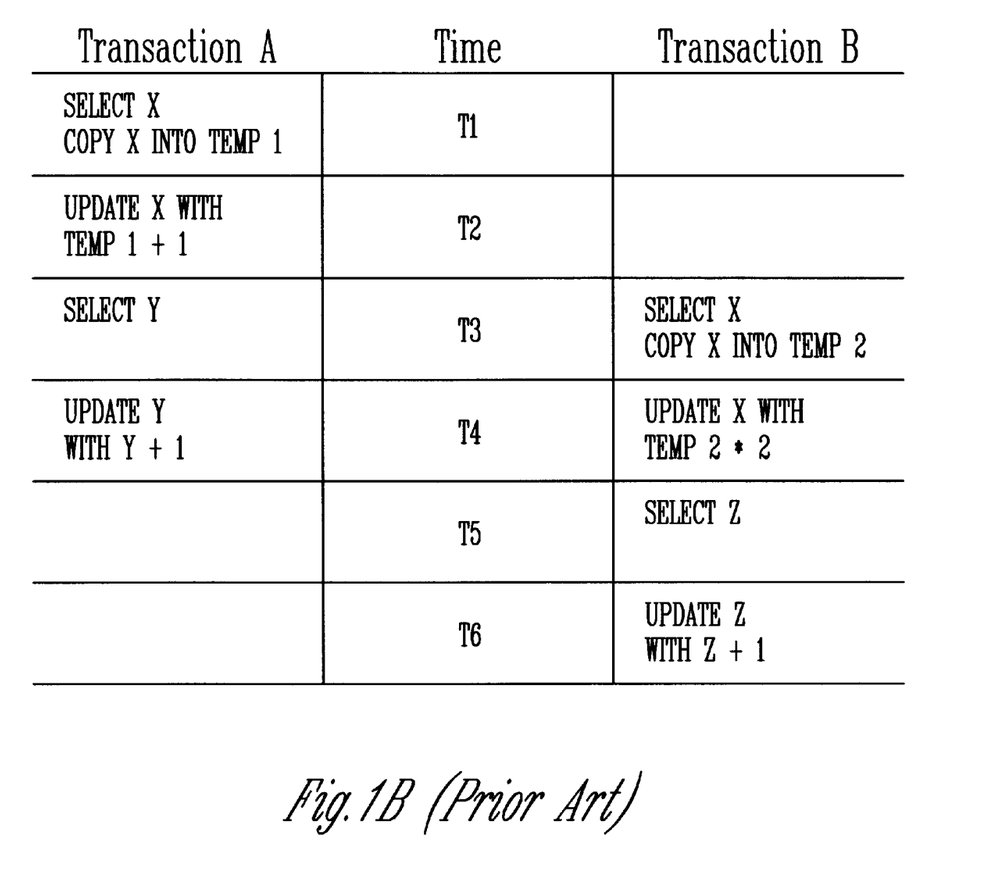
FIG. 1B depicts two transactions occurring simultaneously in a serializable manner to avoid concurrency problems.

An example of two serializable transactions executing simultaneously is depicted in FIG. 1B. In FIG. 1B, at time T1, transaction A retrieves field X and copies it into a variable. At time T2, transaction A updates field X with an incremented value. Although transaction B may attempt to retrieve field X after time T1 and before time T2, transaction B is prevented from doing so by the database until transaction A updates field X so that concurrency problems do not arise. At time T3, transaction B is allowed to retrieve field X and copy it into a variable. Also at time T3, transaction A simultaneously retrieves field Y. At time T4, transaction B updates field X with its current value multiplied by 2, and transaction A updates field Y with an incremented value. At time T5, transaction B retrieves field Z, and at time T6, transaction B updates field Z. As can be seen from this example, transaction A and transaction B are performed simultaneously to improve performance, and since transaction B cannot access field X while transaction A is using it, concurrency problems are avoided.

Most DBMSs are centralized in nature. A "centralized DBMS" is a DBMS where all the data within the database is stored on a single computer, usually the secondary storage device of the computer. In a centralized DBMS, as the number of transactions executing on the DBMS increases, performance of the DBMS significantly decreases and becomes a drain on the overall performance of the computer. As a result, a centralized DBMS acts as a bottleneck which slows down performance of both the computer and programs executing on the computer. It is thus desirable to improve performance of a centralized DBMS.

SUMMARY OF THE INVENTION

A system that improves performance of a centralized DBMS is provided. The improved performance is realized by distributing part of the DBMS's functionality across multiple computers in a client/server environment. The distribution of the DBMS's functionality is performed by a mechanism known as the navigational agent, which is detached from the DBMS. The navigational agent integrates the centralized DBMS into a client/server environment so that performance improvements can be achieved by distributing a portion of the functionality of the centralized DBMS and some of its database objects to client computers. A database object is a unit of data in the database such as one or more fields of a record, one or more records, or one or more tables. By distributing part of the DBMS's functionality and some of the database objects to client computers, transactions can be performed on the client computers without having to access the server computer on which the database resides. Since these transactions are performed by the client computer instead of the server computer, the bottleneck created by the DBMS on the server computer is reduced, which improves performance of both the DBMS and programs interacting with the DBMS.

In accordance with a first aspect of the present invention, a method is provided in a data processing system having a centralized database with database objects, having clients with copies of the database objects that utilize the copies of the database objects, and having a synchronizing agent. The method is performed under the control of the synchronizing agent which is detached from the centralized database. The method distributes a copy of one of the database objects to one of the clients and synchronizes the copy of the database object with the centralized database such that the client is notified when the copy of the database object will become out of date.

In accordance with a second aspect of the present invention, a method is provided in a data processing system having a server computer and client computers. The method is for distributing a centralized database on the server computer having database objects. The method stores copies of a plurality of database objects on a plurality of the client computers by a navigational agent that is detached from the centralized database and executes transactions involving the database objects at the client computers in a serializable manner.

In accordance with a third aspect of the present invention, a data processing system is provided comprising a secondary storage device, a memory, and a processor. The secondary storage device has a database with database objects. The memory contains a database management system that manages the database, a client for maintaining a copy of one of the database objects until being notified that the copy is no longer valid, and a synchronization agent that is detached from the database management system. The client, however, may reside in a separate memory. The synchronization agent determines when the database object is to be updated and notifies the client when the database object is to be updated and will no longer be a valid representation of the database object. The processor runs the database management system, the client, and the synchronization agent.

DETAILED DESCRIPTION OF THE INVENTION

A preferred embodiment of the present invention improves performance of a centralized database management system (DBMS) by distributing part of its functionality across multiple computers in a client/server environment. The distribution of the DBMS's functionality is performed by a mechanism known as a navigational agent on the server computer and a transaction manager on each of the client computers. The navigational agent is detached from the DBMS so that it can operate with any of a number of suitable centralized DBMSs. The navigational agent integrates the centralized DBMS into a client/server environment to achieve performance improvements by distributing a portion of the functionality of the centralized DBMS and some of its database objects to client computers. A database object is a unit of data in the database such as one or more fields of a record, one or more records, or one or more tables. By distributing part of the DBMS's functionality and some of the database objects to client computers, transactions can be performed on the client computers without having to access the server computer on which the database resides. Since these transactions are performed by the client computer instead of the server computer, the bottleneck created by the DBMS on the server computer is reduced, which improves performance of both the DBMS and programs interacting with the DBMS.

To improve performance, a preferred embodiment distributes some of the DBMS's database objects to client computers, where they are stored in an object cache. The object cache stores copies of database objects which are maintained by the DBMS, and the transaction manager can perform queries on these copies. When distributing the database objects, concurrency management and cache coherency become problems for which solutions are needed. The centralized DBMS ensures that the transactions it performs on database objects execute so as to avoid concurrency problems. However, when database objects are distributed from the centralized DBMS to client computers where transactions can be performed on them, the centralized DBMS does not have control over the distributed copies of the database objects. Consequently, there are no safeguards against concurrency problems occurring nor are there safeguards against the distributed copy of the database object becoming out of synchronization with respect to the master copy of the database object maintained by the centralized DBMS. To solve these problems, the navigational agent ensures that database transactions running on the client computers are serializable, thus ensuring that transactions involving a common database object are performed so that a correct result is generated and concurrency problems are avoided. Additionally, the navigational agent notifies the client computers when their copy of a database object will become out of synchronization with the DBMS's version of the database object (i.e., it will soon be updated). In this manner, the client computers that use the distributed copies of database objects are ensured to be notified when the distributed copies of the database objects become out of date, which solves the problem of synchronizing the distributed copy of a database object with the DBMS and which provides cache coherency.

The serializability and synchronization provided by the navigational agent are provided through the use of callback messages. A "callback message" is a message sent from the navigational agent to a client computer, where the callback message requests a response when the client computer has completed processing with a particular database object. The generation of a callback message to a client computer indicates that another client computer has requested write access ("a writelock") to the object; thus the callback message provides notification that the database object will soon become out of date. Upon receiving a callback, if a client computer is currently using the object as part of a transaction, the client computer delays responding to the callback message until it has completed utilizing the object and the transaction has completed. However, if the client computer is not using the object, the client computer immediately responds to the callback message so that the transaction requesting the writelock may proceed and be committed to the database. After responding to the callback message, the client computer discards the database object, as it will soon become out of date. For example, when a client computer wishes to update an object, it first issues a writelock request to the navigational agent. The navigational agent then requests a writelock on the database object from the DBMS, which grants the request unless another writelock is outstanding. After obtaining the writelock, the navigational agent notifies each client computer having a copy of the database object using a callback message so that these client computers are made aware that the database object will become out of date. Additionally, the navigational agent does not allow an update of the database object to be committed until a reply to each callback message is received. As such, each client computer having a copy of the database object will complete the transaction using the database object before the database object is updated, which provides serializability, and each client will discard its copy of the database object after the transaction completes because the database object will become out of date.

A preferred embodiment provides a transaction manager on each of the client computers so that application programs executing transactions at the client computers do not need to know of the navigational agent or the distribution of the centralized DBMS. In performing this functionality, the transaction manager receives a transaction from an application program and performs the statements of the transaction on the centralized DBMS and, in some circumstances, on the database objects in the object cache. The transaction manager performs a statement on the database objects in the object cache when the statement is a select statement and the database objects necessary for performing the query are located in the object cache. Additionally, the transaction manager processes all callback messages received by the client computer.

As stated above, the navigational agent distributes the processing performed by a centralized DBMS to improve performance. To provide this functionality, the navigational agent prevents concurrency problems from occurring by providing for the serializable execution of the transactions running on the client computers, and the navigational agent provides cache coherency by ensuring that the distributed database objects are synchronized with their counterparts in the DBMS.

EXAMPLE

Figures 2, 3:
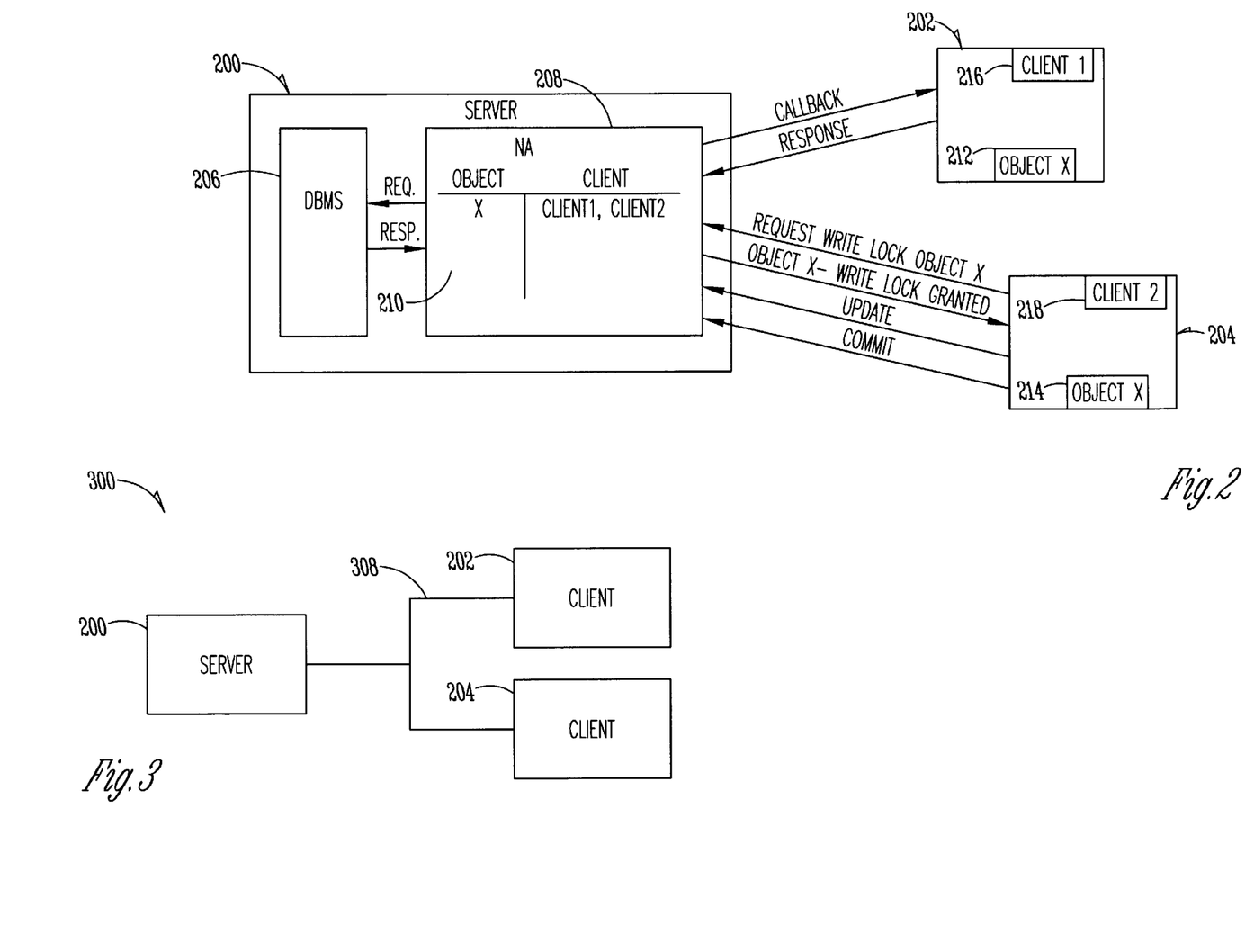
FIG. 2 depicts an example use of a callback message by a preferred embodiment of the present invention.
FIG. 3 depicts a data processing system suitable for practicing a preferred embodiment of the present invention.

FIG. 2 depicts an example of the techniques utilized by a preferred embodiment. In FIG. 2, a server computer 200 is interacting with two client computers 202 and 204. The server computer 200 contains a centralized DBMS 206 and a navigational agent 208 that is detached from the DBMS. The navigational agent 208 maintains a directory structure 210 indicating all clients that have been allocated particular database objects. For example, the directory structure 210 contains an entry indicating that object X has been allocated to both "client 1" and "client 2." Client computer 202 has a client 216 ("client 1"), and client computer 204 has a client 218 ("client 2"). In a preferred embodiment, client 1 and client 2 are the transaction managers of the respective client computers 202 and 204. The transaction manager is described in greater detail below. Both client computers 202 and 204 have an object cache 212 and 214 which contain any database objects that the clients may be using. For example, object cache 212 and object cache 214 contain a copy of object X.

In the example depicted in FIG. 2, client 1 and client 2 have already retrieved object X by issuing a select statement to the DBMS 206 via the navigational agent 208. When processing the select statement, the DBMS 206 automatically places a readlock on the identified database objects which permits read access to these database objects. After receiving object X, the example begins with client 2 requesting that a writelock be granted on object X so that object X may be updated. Client 2 sends this request to the navigational agent 208 which then passes the request to the DBMS 206. The DBMS 206 will grant the writelock as long as no other writelocks are outstanding on the object. In a preferred embodiment, only one writelock at a time is allowed per database object. While a writelock is in effect on a database object, no other locks are granted, not even readlocks. Conversely, when a database object does not have a writelock in effect, multiple readlocks may be granted.

After receiving the writelock request, the DBMS 206 passes a response to the writelock request to the navigational agent 208, and the navigational agent sends an indication of this response to client 2. Assuming the writelock is granted, after sending the indication, the navigational agent 208 accesses the directory structure 210 to determine all clients that currently have object X allocated. The navigational agent 208 then sends a callback message to each of these clients other than the client requesting the writelock (e.g., client 1) to notify them that object X will soon become out of date. Upon receiving the callback, client 1 determines if a transaction is executing that utilizes object X. If such a transaction is executing, client 1 delays responding to the callback until it has completed processing. If client 1 determines that object X is not in use, client 1 immediately sends back a response. After sending the response, client 1 discards object X since it will be updated and object X will become out of date. Upon receiving the response, the navigational agent 208 deallocates object X from client 1 by deleting the indication of client 1 in the directory structure 210.

At some point while client 1 is responding to the callback message, client 2 modifies a portion of object X and sends an update request to the navigational agent 208. This update request may be a delayed update request that requests an update at a future time. The navigational agent 208 passes the update request to the DBMS 206. Subsequently, client 2 issues a commit statement to commit the update and the navigational agent 208 delays passing the commit statement to the DBMS 206 until it has received a response to all outstanding callback messages. After receiving a response to all callback messages, the navigational agent 208 can guarantee that all transactions involving object X have completed and thus the update to object X can be committed and concurrency problems involving object X are avoided. Having ensured that concurrency problems with respect to object X will be avoided, the navigational agent 208 passes the commit to the DBMS 206. In this manner, a transaction performed by client 1 and a transaction performed by client 2 are executed simultaneously in a serializable manner.

Although a preferred embodiment is described as a client fetching an object before an update is requested on the object, the present invention also works on blind updates. A "blind update" is an update requested on an object that has not already been fetched by the client. In response to receiving the blind update request, the navigational agent accesses the directory structure and sends callback messages to the clients, similar to that described above.

Implementation Details

FIG. 3 depicts a data processing system 300 suitable for practicing a preferred embodiment of the present invention. The data processing system 300 contains server computer 200, client computer 202, and client computer 204 interconnected via a network 308, such as a local area network or a wide area network. One skilled in the art will appreciate that the data processing system 300 may contain additional client computers.

Figure 4:
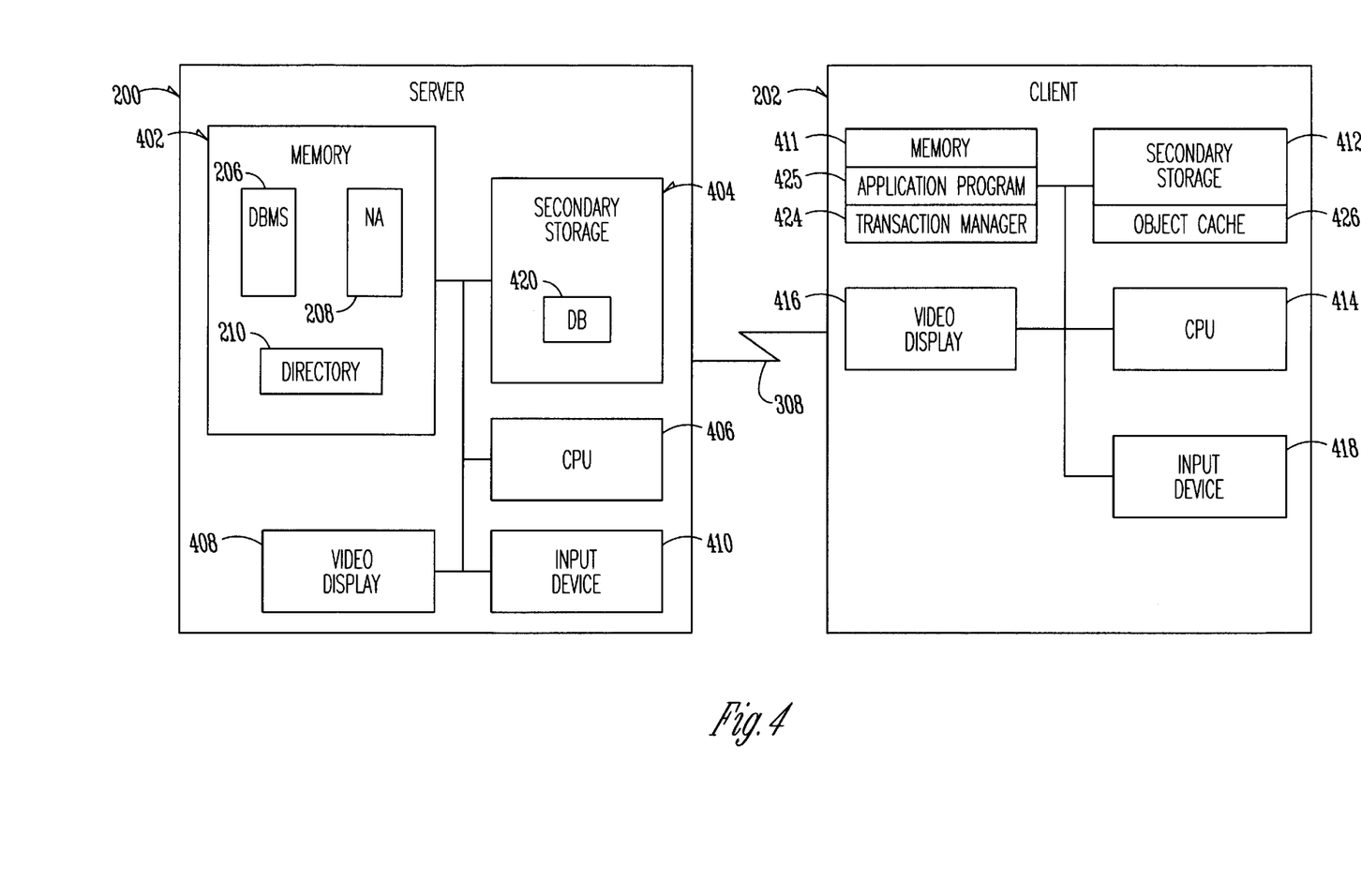
FIG. 4 depicts a more-detailed diagram of the server computer and a client computer of FIG. 3.

FIG. 4 depicts a more-detailed diagram of server computer 200 and client computer 202. Although client computer 202 is depicted, it should be appreciated that the other client computers are similarly configured. Server computer 200 contains a memory 402, a secondary storage device 404, a video display 408, a central processing unit (CPU) 406, and an input device 410. The memory 402 contains a suitable centralized DBMS 206, such as the Microsoft SQL Server available from Microsoft Corporation of Redmond, Wash.; the navigational agent 208; and the directory structure 210. The secondary storage device 404 contains a database 420 that stores the data for the DBMS 206. The client computer 202 contains a memory 411, a secondary storage device 412, a video display 416, a CPU 414, and an input device 418. The memory 411 contains an application program 425 and a transaction manager 424 for processing transactions and for interacting with the navigational agent 208. Since the transaction manager 424 performs the transactions and interacts with the navigational agent 208, it is the transaction manager that acts as the client. However, one skilled in the art will appreciate that such functionality can be performed by either the application program 425 or another entity on the client computer 202, and as such, the term client should be construed to include all such entities. The secondary storage device 412 contains an object cache 426 that contains database objects received from the DBMS 206. The database objects in the object cache 426 are the results of previous queries performed on the DBMS 206. The database objects in the results are maintained in the object cache 426 so that subsequent transactions may be performed against these objects instead of having to execute the transaction on the DBMS 206.

The transaction manager 424 receives a transaction from the application program 425 and performs the statements in the transaction against the objects in the object cache 426 of the secondary storage device 412. Alternatively, if the objects necessary to perform the transaction are not found in the object cache 426, the statements are performed against the DBMS 206 via the navigational agent 208. In circumstances where the transaction manager 424 can perform a select statement or query against objects in the object cache 426, the burden of performing this processing is relieved from the DBMS 206, which significantly improves performance of the server computer 200 and the DBMS 206.

Figure 5A:
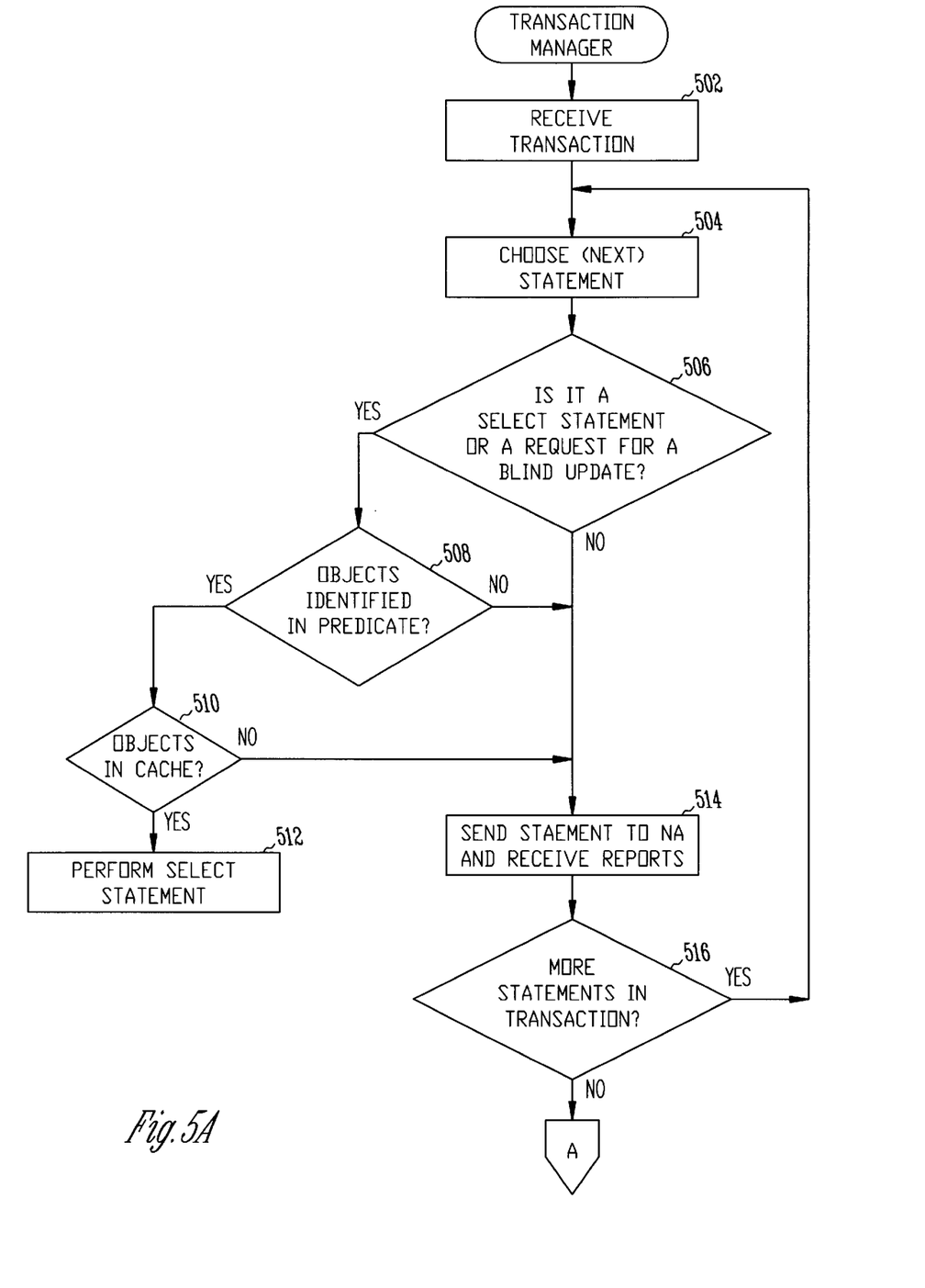
FIGS. 5A and 5B depict a flowchart of the steps performed by the transaction manager of a preferred embodiment of the present invention.
Figure 5B:
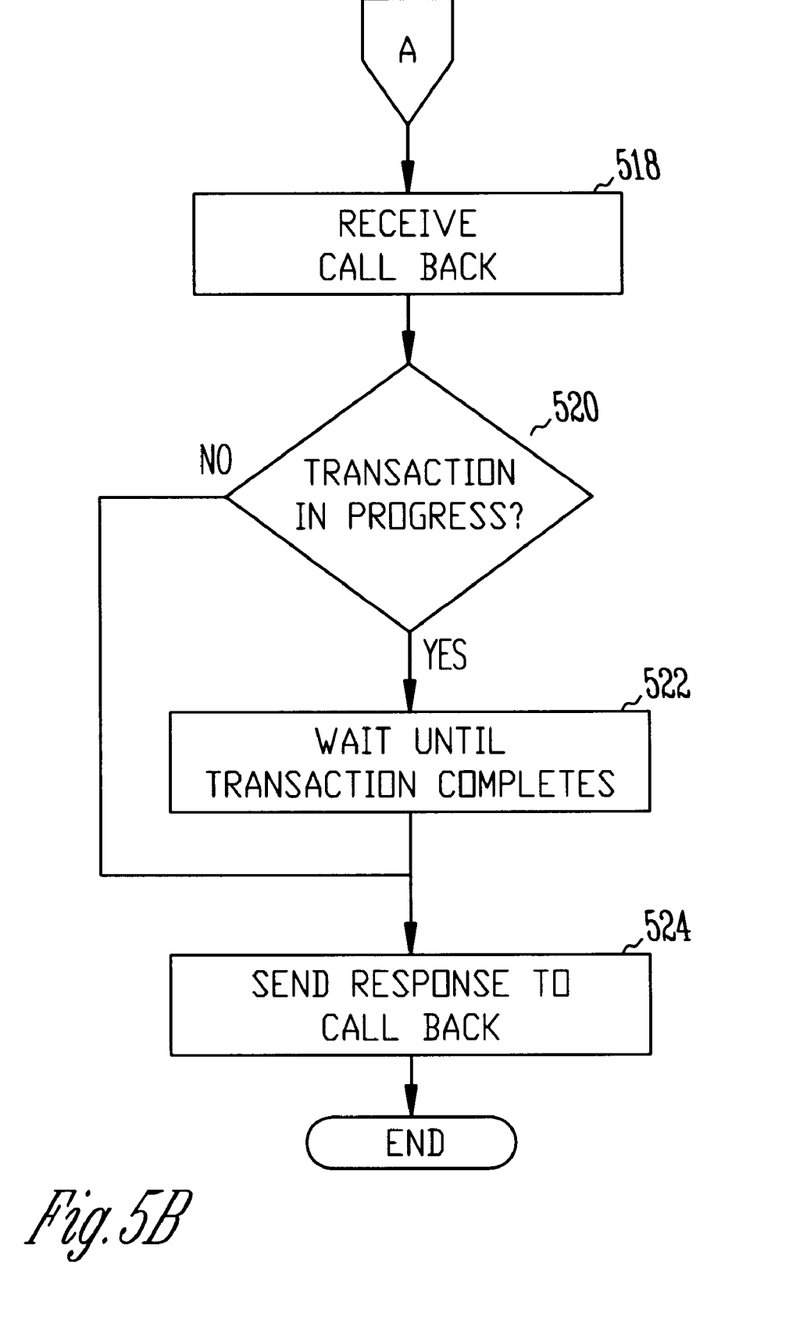

FIGS. 5A and 5B depict a flowchart of the steps performed by the transaction manager of a preferred embodiment. The transaction manager first receives a transaction from the application program (step 502). The transaction manager then chooses a statement from the transaction, starting with the first statement (step 504). After selecting a statement, the transaction manager determines if the statement is a select statement performing a query (step 506). If the statement is a select statement, the transaction manager determines if specific objects are identified in the predicate of the select statement (step 508). In this step, the transaction manager determines whether a particular database object is identified or whether a close-ended range of database objects is identified. Each database object in the system has a 16-byte unique identifier associated with it. Thus, in this step, the determination made is whether a particular object is specified in the predicate (e.g., object id. 123) or whether a close-ended range is specified (e.g., object ids. 123–125). The transaction manager cannot handle open-ended ranges of objects (e.g., object ids.>123) since the transaction manager does not have knowledge of all objects maintained by the DBMS. The transaction manager only knows of the database objects in the local object cache.

If the condition of step 508 is true, the transaction manager determines if the requested database objects are located in the object cache (step 510). If the requested database objects are in the object cache, the transaction manager performs the select statement on the objects in the object cache (step 512). However, if the database objects are not in the cache, if specific objects are not identified in the predicate, or if the statement is not a select statement, the transaction manager sends the statement to the navigational agent to be processed by the DBMS (step 514). For example, the statement may be a begin transaction, commit, rollback, update, delete, or insert statement. After sending the statement to the navigational agent, the navigational agent sends the statement to the DBMS where the statement is performed and results are returned. If the statement is a select statement, the results returned are a set of database objects that reflect the results of the query. For example, the results may include database objects reflecting all records of employees living in a particular city. It should be appreciated that the returned database objects may contain one or more fields, one or more records, or one or more tables. After receiving the set of database objects, the transaction manager stores the database objects into the object cache for use in performing queries until such time as they will be updated by another client. After sending the statement to the navigational agent, the transaction manager determines whether there are more statements to be performed as part of the transaction (step 516). If there are more statements in the transaction, processing continues to step 504. However, if there are no more statements in the transaction, processing continues to step 518 in FIG. 5B.

Steps 518–524 reflect the processing performed when the transaction manager receives a callback message. Although these steps are described as occurring after a transaction, one skilled in the art will appreciate that these steps can be performed during a transaction. The transaction manager receives a callback message from the navigational agent that identifies a database object (step 518). After receiving the callback message, the transaction manager determines if there is a transaction in progress that is utilizing the database object identified in the callback message (step 520). If there is such a transaction in progress, the transaction manager waits until the transaction completes (step 522). After waiting until the transaction completes, or if there is no transaction in progress, the transaction manager sends a response to the callback message to the navigational agent (step 524). After sending the response, processing ends.

Figure 6:
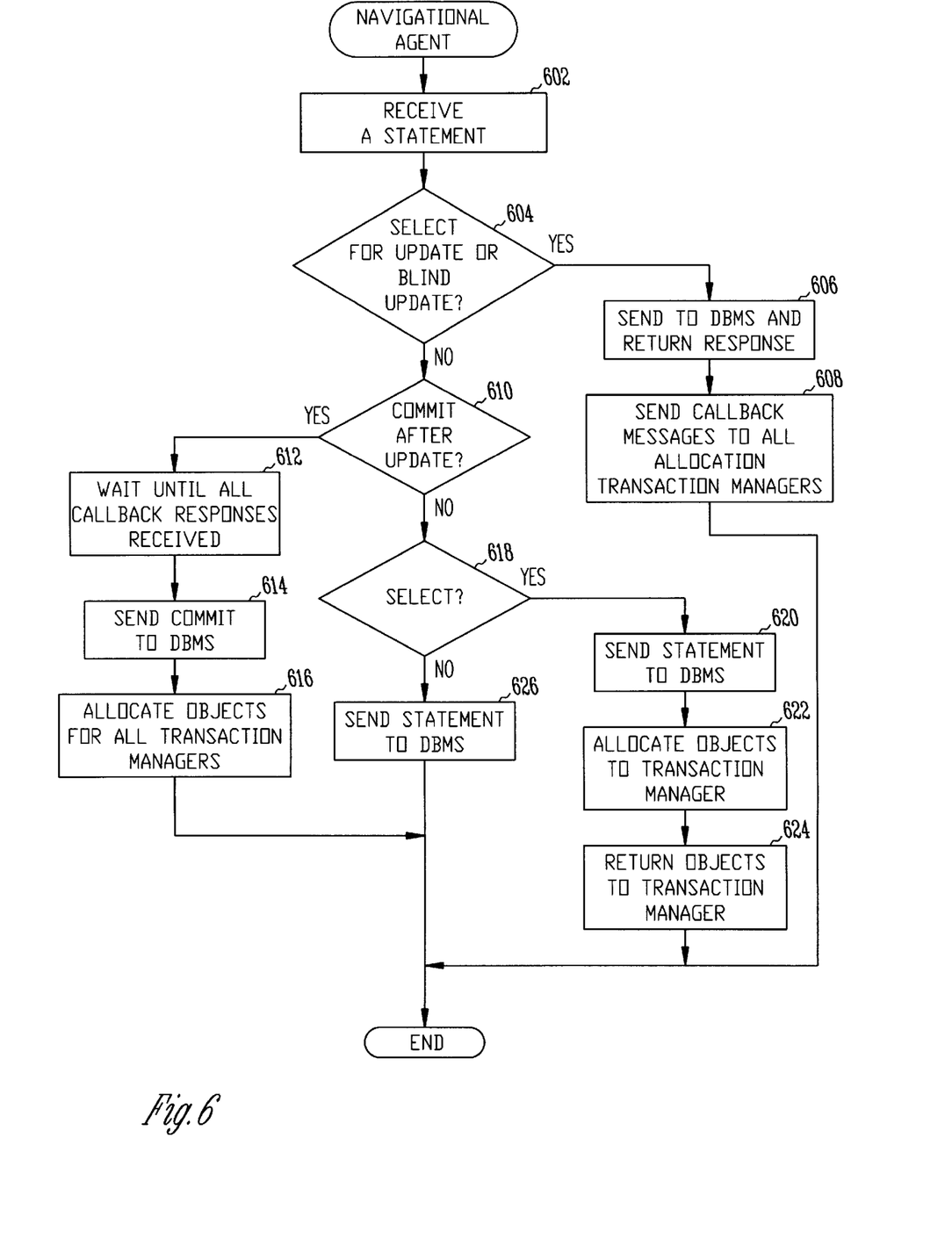
FIG. 6 depicts a flowchart of the steps performed by the navigational agent of a preferred embodiment of the present invention.

FIG. 6 depicts a flowchart of the steps performed by the navigational agent of a preferred embodiment. The navigational agent first receives a statement from a transaction manager on a client computer (step 602). After receiving a statement, the navigational agent determines if the statement is a select for update statement or whether the statement requests a blind update (step 604). The "select for update" statement requests that a writelock be placed on a specified database object. The select for update statement does not itself request a copy of the object; rather, it is assumed that the transaction manager already has a copy of the object with a readlock on it. Therefore, before a transaction manager can obtain a writelock on a database object, it must first retrieve the object from the database utilizing a select command and receive a readlock. Only after receiving the object with the readlock can the transaction manager issue a select for update statement to obtain a writelock on the object. The select for writelock statement is not a standard SQL statement, but is provided by the centralized DBMS of a preferred embodiment. One skilled in the art will appreciate that the present invention can be used with a centralized database that does not support the select for writelock statement. Similar to the select for update, the blind update requests that a writelock be placed on the database object in preparation for an update. However, in this case, the transaction manager has not received (or fetched) a copy of the object. If the statement is a select for update statement or a request for a blind update, the navigational agent sends the statement to the DBMS and returns the response to the transaction manager (step 606). In this step, the navigational agent requests a writelock from the DBMS and the DBMS will grant the writelock as long as no other writelocks are outstanding on this object. Next, the navigational agent sends a callback message to all clients except the requesting client who have allocated the object as indicated in the directory structure (step 608). The callback messages are only sent if the writelock has been granted.

If the statement is not a select for update statement or a request for a blind update, the navigational agent determines if the statement is a commit statement where an update occurred as part of the transaction (step 610). If a transaction manager is committing a transaction that performed an update, the navigational agent waits until all callback responses have been received (step 612). The navigational agent then sends the commit statement to the DBMS (step 614) and deallocates the database object from all transaction managers that have allocated the database object except for the transaction manager with the writelock (step 616). If the statement is not a commit statement where the transaction performed an update, the navigational agent determines if the statement is a select statement (step 618).

If the statement is a select statement, the navigational agent sends the statement to the DBMS for processing (step 620). The navigational agent then allocates the returned database objects ("the results") to the transaction manager (step 622) and returns the database objects to the transaction manager (step 624). In this step, the DBMS grants a readlock on the database objects. If the statement is not a select statement, the navigational agent sends the statement to the DBMS for processing (step 626). In this step, the statement may be an update, insert, begin transaction, a rollback, or a commit where no update occurred during the transaction. Next, processing ends.

While the present invention has been described with reference to a preferred embodiment thereof, those skilled in the art will know of various changes in form that may be made without departing from the spirit and scope of the claimed invention as defined in the appended claims.

What is claimed is:

1. A method in a data processing system for synchronizing database objects contained in a centralized database management system on a server computer with copies of the database objects stored in client computers, the synchronizing performed by a synchronization agent that is detached from the centralized database management system, the method performed by the synchronization agent comprising the steps of:

receiving a request from one of the client computers requesting a selected one of the database objects;

sending the request to the centralized database management system such that the centralized database management system grants a readlock on the selected database object;

sending a copy of the selected database object to the client computer;

storing an indication of the client computer into a directory structure, the indication indicating that the client computer has allocated the selected object;

receiving a request from the client computer requesting a writelock for the selected database object;

sending the writelock request to the centralized database management system such that the centralized database management system grants the writelock;

accessing the directory structure to determine allocating clients that have allocated the selected object;

sending to the allocating clients a callback message requesting a response when the allocating clients have completed use of the selected object, the callback message indicating that the selected object will become updated;

receiving a request to modify the selected object from the client computer;

waiting until receiving a response to each of the callback messages to ensure that the allocating clients have completed use of the selected object; and modifying the selected object after receiving the response to each of the callback messages.

2. The method of claim 1 wherein the step of receiving a request from one of the client computers includes receiving a query.

3. The method of claim 2 wherein the first query is performed as part of a first transaction, and wherein the method further includes receiving a second query as part of a second transaction from a second of the client computers, and performing the first transaction and the second transaction in a serializable manner.

4. A method in a data processing system for synchronizing database objects contained in a centralized database management system with copies of the database objects stored with clients that utilize the copies of the database objects, the synchronizing performed by a synchronizing agent, comprising the steps of:

one of the clients sending a request for a writelock on a selected one of the database objects to the synchronizing agent, the client having a copy of the selected database object;

the synchronizing agent receiving the writelock request and sending the writelock request to the centralized database management system, the synchronizing agent being detached from the centralized database management system;

the centralized database management system granting the writelock request;

the synchronizing agent accessing a directory structure containing indications of allocating clients that have allocated the selected database object and sending a callback message to each of the allocating clients requesting a response when the allocating client has completed use of the selected database object, the callback message indicating that the selected database object will become updated;

the client modifying a portion of the selected database object and sending an indication to the synchronizing agent to update the centralized database management system;

the synchronizing agent receiving the indication, waiting to receive the response from each allocating client, and sending the indication to the centralized database management system after receiving the response from each allocating client; and the centralized database management system receiving the indication and updating the selected database object.

5. A method in a data processing system for distributing copies of database objects contained in a centralized database to clients that utilize the copies of the database objects, the distribution performed by a distribution agent, comprising the steps of:

under control of the distribution agent which is detached from the centralized database, receiving a request from a client for a writelock on a selected one of the database objects, the client having a copy of the selected database object;

requesting the writelock from the centralized database wherein the centralized database grants the writelock;

sending an indication that the writelock has been granted to the client wherein the client modifies the copy of the selected object;

determining allocating clients that have a copy of the selected object;

sending a notification to the allocating clients requesting a response when the allocating clients have completed use of the selected object, the notification indicating that the selected object will become updated;

receiving a request from the client requesting that the centralized database be updated to reflect the modifications;

waiting until receiving the response from each allocating client to ensure that each allocating client has completed use of the selected object; and updating the centralized database after receiving the response from each allocating client.

6. The method of claim 5 wherein the data processing system has a directory structure containing an indication of the allocating clients and wherein the step of determining allocating clients includes accessing the directory structure.

7. The method of claim 5 wherein the step of waiting includes:

for each response received,
deallocating the selected object from the allocating client.

8. The method of claim 7 wherein each allocating client has a readlock on the selected object and wherein the step of deallocating the selected object includes terminating the readlock.

9. The method of claim 5 wherein the step of receiving a request from the client requesting that the centralized database be updated includes receiving an update statement.

10. The method of claim 9 wherein the step of receiving an update statement further includes sending the update statement to the centralized database.

11. The method of claim 10 wherein the update statement is performed as part of a transaction and wherein the step of sending the update statement includes receiving a commit statement from the client to commit the transaction.

12. A method in a data processing system for distributing copies of database objects contained in a centralized database to clients that utilize the copies of the database objects, the distribution performed by a distribution agent, the method performed by one of the clients having a copy of a selected one of the database objects, comprising the steps of:

sending a request for a writelock on the selected one of the database objects to the distribution agent which is detached from the centralized database such that the distribution agent determines allocating clients currently having a copy of the selected database object and requests a notification from each allocating client when the allocating client has completed use of the copy of the selected database object;

receiving from the distribution agent an indication that the writelock has been granted;

modifying the copy of the selected database object; and sending a request to the distribution agent to update the centralized database to reflect the modification made to the copy of the selected database object, wherein the distribution agent waits until receiving the notification from each of the allocating clients before updating the centralized database.

13. The method of claim 12 wherein the data processing system comprises a server computer containing the centralized database and the distribution agent and comprises a client computer containing the client, wherein the step of sending a request for a writelock includes sending the request for the writelock to the distribution agent on the server computer and wherein the step of sending a request to the distribution agent to update the centralized database includes sending the request to the distribution agent on the server computer.

14. A method in a data processing system for synchronizing a database object contained in a centralized database with a copy of the database object stored with a client that performs transactions utilizing the copy of the database object, the synchronizing performed by a synchronizing agent, the method performed by the client comprising the steps of:

receiving a callback message from the synchronizing agent indicating that the database object will be updated and the copy will become out of date, the synchronizing agent being detached from the centralized database;

determining whether a transaction is in progress which utilizes the database object;

when it is determined that the transaction is in progress which utilizes the database object,         delaying a response to the callback message until the transaction has completed; and         responding to the synchronizing agent indicating that the database object is no longer being used by the client when the transaction has completed; and     when it is determined that the transaction is not in progress which utilizes the database object,         responding to the synchronizing agent indicating that the database object is not being used by the client.

15. The method of claim 14, further including the step of discarding the copy of the database object to prevent the use of the copy when the copy becomes out of date.

16. A method in a data processing system having a centralized database with database objects, having clients with copies of the database objects that utilize the copies of the database objects, and having a synchronizing agent, comprising the steps of:

under control of the synchronizing agent which is detached from the centralized database,         distributing a copy of one of the database objects to one of the clients; and         synchronizing the copy of the database object with the centralized database such that the client is notified when the copy of the database object will become out of date.

17. The method of claim 16 wherein the step of synchronizing includes:

determining when the copy of the database object will become out of date; and     sending a callback message to the client indicating that the copy of the database object will become out of date when it is determined that the database object will become out of date.

18. The method of claim 17 wherein the step of determining includes receiving a request from a second of the clients to update the database object and determining that the database object is to become out of date in response to receiving the request from the second client.

19. A method in a data processing system having a server computer and client computers for distributing a centralized database on the server computer having database objects, comprising:

storing copies of a plurality of the database objects on a plurality of the client computers by a navigational agent that is detached from the centralized database; and     executing transactions involving the database objects at the client computers in a serializable manner.

20. The method of claim 19 wherein the step of executing transactions includes sending callback messages from the navigational agent to the client computers to facilitate the execution of the transactions in a serializable manner.

21. A data processing system, comprising:

a client computer, further comprising:

a memory containing a copy of a selected database object and containing a client that requests that a writelock be placed on the selected database object, that modifies the selected database object after the writelock has been granted, and that generates an update indication to request update of the selected database object; and         a processor for running the client; and     a server computer, further comprising:

a secondary storage device containing a database with database objects including the selected database object;

a memory containing a directory structure with indications of allocating clients that have allocated the selected database object for access;

a database management system for managing the database and for granting writelocks on the database objects; and             a distribution agent detached from the database management system that receives the writelock request from the client, that obtains a writelock from the database management system for the selected database object, that accesses the directory structure to determine the allocating clients, that sends each allocating client a message requesting a response when the allocating client has completed use of the selected database object, that receives the update indication from the client, that waits until receiving the response from each allocating client, and that sends the update indication to the database management system after receiving the response from each allocating client; and         a processor for running the database management system and the distribution agent.

22. A data processing system, comprising:

a secondary storage device having a database with database objects; and     a memory containing:

a database management system that manages the database;

a client for maintaining a copy of one of the database objects until being notified that the copy is no longer valid;

a synchronization agent detached from the database management system that determines when the database object is to be updated and that notifies the client when the database object is to be updated and will no longer be a valid representation of the database object; and     a processor for running the database management system, the client, and the synchronization agent.

23. The data processing system of claim 22, further including a server computer with a memory and a secondary storage device and a client computer with a memory, wherein the database is stored on the secondary storage device of the server computer, wherein the synchronization agent and the database management system are stored in the memory of the server computer, and wherein the client is stored in the memory of the client computer.

24. The data processing system of claim 22 wherein the database is a centralized database.

25. The data processing system of claim 22 wherein the client stores the copy of the database object in an object cache.

26. The data processing system of claim 22 wherein the database management system operates in response to SQL statements.

27. The data processing system of claim 22 wherein the memory further includes a second client that maintains a copy of a second one of the database objects, that executes transactions against the copy of the second database object, and that executes transactions against the database objects in the database, wherein the first client executes transactions against the copy of the database object and against the database objects in the database, and wherein the synchronization agent ensures that the transactions executed by both the first client and the second client are executed in a serializable manner.

28. A computer-readable medium containing instructions for controlling a data processing system to distribute copies of database objects contained in a centralized database to clients that utilize the copies of the database objects, the distribution performed by a distribution agent performing the steps of:
under control of the distribution agent which is detached from the centralized database,
receiving a request from a client for a writelock on a selected one of the database objects, the client having a copy of the selected database object;
requesting the writelock from the centralized database wherein the centralized database grants the writelock;
sending an indication that the writelock has been granted to the client wherein the client modifies the copy of the selected object;
determining allocating clients that have a copy of the selected object;
sending a notification to the allocating clients requesting a response when the allocating clients have completed use of the selected object, the notification indicating that the selected object will become updated;
receiving a request from the client requesting that the centralized database be updated to reflect the modifications;
waiting until receiving the response from each allocating client to ensure that each allocating client has completed use of the selected object; and
updating the centralized database after receiving the response from each allocating client.

29. The computer-readable medium of claim 28 wherein the data processing system has a directory structure containing an indication of the allocating clients and wherein the step of determining allocating clients includes accessing the directory structure.

30. The computer-readable medium of claim 28 wherein the step of waiting includes:
for each response received,
deallocating the selected object from the allocating client.

31. The computer-readable medium of claim 30 wherein each allocating client has a readlock on the selected object and wherein the step of deallocating the selected object includes terminating the readlock.

32. The computer-readable medium of claim 28 wherein the step of receiving a request from the client requesting that the centralized database be updated includes receiving an update statement.

33. The computer-readable medium of claim 32 wherein the step of receiving an update statement further includes sending the update statement to the centralized database.

34. The computer-readable medium of claim 33 wherein the update statement is performed as part of a transaction and wherein the step of sending the update statement includes receiving a commit statement from the client to commit the transaction.

35. A computer-readable medium containing instructions for controlling a data processing system to perform a method for distributing copies of database objects contained in a centralized database to clients that utilize the copies of the database objects, the distribution performed by a distribution agent, the method performed by one of the clients having a copy of a selected one of the database objects, the method comprising the steps of:
sending a request for a writelock on the selected one of the database objects to the distribution agent which is detached from the centralized database such that the distribution agent determines allocating clients currently having a copy of the selected database object and requests a notification from each allocating client when the allocating client has completed use of the copy of the selected database object;
receiving from the distribution agent an indication that the writelock has been granted;
modifying the copy of the selected database object; and
sending a request to the distribution agent to update the centralized database to reflect the modification made to the copy of the selected database object, wherein the distribution agent waits until receiving the notification from each of the allocating clients before updating the centralized database.

36. The computer-readable medium of claim 35 wherein the data processing system comprises a server computer containing the centralized database and the distribution agent and comprises a client computer containing the client, wherein the step of sending a request for a writelock includes sending the request for the writelock to the distribution agent on the server computer and wherein the step of sending a request to the distribution agent to update the centralized database includes sending the request to the distribution agent on the server computer.

37. A computer-readable medium containing instructions for controlling a data processing system to perform a method for synchronizing a database object contained in a centralized database with a copy of the database object stored with a client that performs transactions utilizing the copy of the database object, the synchronizing performed by a synchronizing agent, the method performed by the client by performing the steps of:
receiving a callback message from the synchronizing agent indicating that the database object will be updated and the copy will become out of date, the synchronizing agent being detached from the centralized database;
determining whether a transaction is in progress which utilizes the database object;
when it is determined that the transaction is in progress which utilizes the database object,
delaying a response to the callback message until the transaction has completed; and
responding to the synchronizing agent indicating that the database object is no longer being used by the client when the transaction has completed; and
when it is determined that the transaction is not in progress which utilizes the database object,
responding to the synchronizing agent indicating that the database object is not being used by the client.

38. The computer-readable medium of claim 37, further including the step of discarding the copy of the database object to prevent the use of the copy when the copy becomes out of date.

39. A computer-readable medium containing instructions for controlling a data processing system to perform a method, the data processing system having a centralized database with database objects, having clients with copies of the database objects that utilize the copies of the database objects, and having a synchronizing agent, the method comprising the steps of:

under control of the synchronizing agent which is detached from the centralized database,
distributing a copy of one of the database objects to one of the clients; and
synchronizing the copy of the database object with the centralized database such that the client is notified when the copy of the database object will become out of date.

40. The computer-readable medium of claim 39 wherein the step of synchronizing includes:

determining when the copy of the database object will become out of date; and
sending a callback message to the client indicating that the copy of the database object will become out of date when it is determined that the database object will become out of date.

41. The computer-readable medium of claim 40 wherein the step of determining includes receiving a request from a second of the clients to update the database object and determining that the database object is to become out of date in response to receiving the request from the second client.

42. A computer-readable medium containing instructions for controlling a data processing system having a server computer and client computers to perform a method for distributing a centralized database on the server computer having database objects, the method comprising:

storing copies of a plurality of the database objects on a plurality of the client computers by a navigational agent that is detached from the centralized database; and
executing transactions involving the database objects at the client computers in a serializable manner.

43. The computer-readable medium of claim 42 wherein the step of executing transactions includes sending callback messages from the navigational agent to the client computers to facilitate the execution of the transactions in a serializable manner.

44. A method in a data processing system for distributing copies of database objects contained in a centralized database to clients that utilize the copies of the database objects, the distribution performed by a distribution agent, comprising the steps of:

under control of the distribution agent which is detached from the centralized database,
receiving an update request from a client to modify a selected one of the database objects;
passing the update request to the centralized database wherein the centralized database indicates that the update request will be successfully processed,
determining allocating clients that have a copy of the selected object;
sending a notification to the allocating clients requesting a response when the allocating clients have completed use of the selected object, the notification indicating that the selected object will become updated;
receiving a commit request from the client requesting that the centralized database be updated to reflect the modifications requested by the update request;
waiting until receiving the response from each allocating client to ensure that each allocating client has completed use of the selected object; and
updating the centralized database after receiving the response from each allocating client.

45. A computer-readable medium containing instructions for controlling a data processing system to perform a method for distributing copies of database objects contained in a centralized database to clients that utilize the copies of the database objects, the distribution performed by a distribution agent, the method comprising the steps of:

under control of the distribution agent which is detached from the centralized database,
receiving an update request from a client to modify a selected one of the database objects;
passing the update request to the centralized database wherein the centralized database indicates that the update request will be successfully processed,
determining allocating clients that have a copy of the selected object;
sending a notification to the allocating clients requesting a response when the allocating clients have completed use of the selected object, the notification indicating that the selected object will become updated;
receiving a commit request from the client requesting that the centralized database be updated to reflect the modifications requested by the update request;
waiting until receiving the response from each allocating client to ensure that each allocating client has completed use of the selected object; and
updating the centralized database after receiving the response from each allocating client.

* * * * *